UNITED STATES PATENT OFFICE.

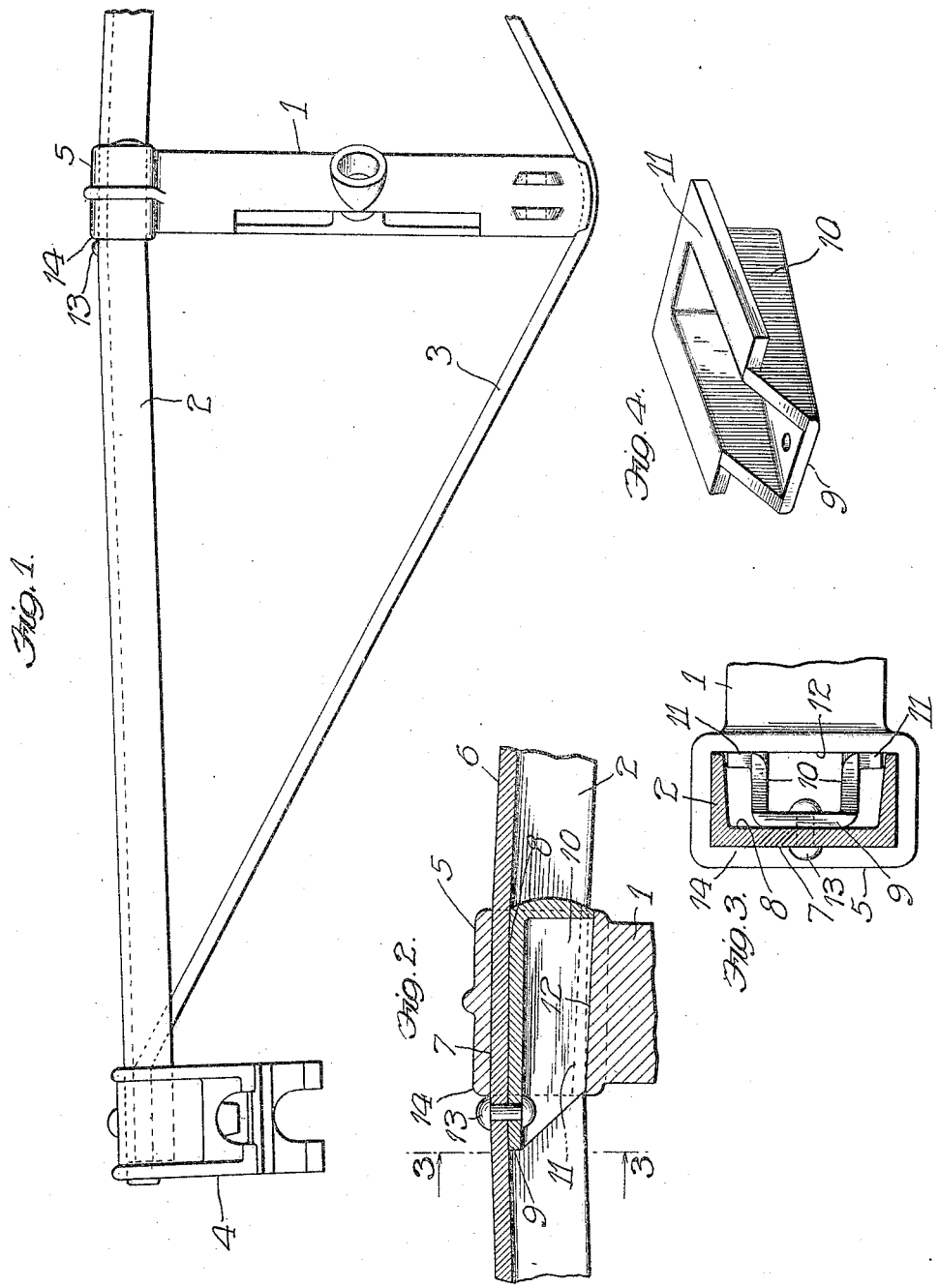

CHARLES F. HUNTOON, OF CHICAGO, ILLINOIS.

BRAKE BEAM.

1,422,863.  Specification of Letters Patent.  Patented July 18, 1922.

Application filed July 11, 1921. Serial No. 483,835.

*To all whom it may concern:*

Be it known that I, CHARLES F. HUNTOON, a citizen of the United States of America, and a resident of Chicago, county of Cook, and State of Illinois, have invented certain new and useful Improvements in Brake Beams, of which the following is a specification.

This invention relates to brake beams for railway cars and particularly to an improved means for securing the strut of the truss-shaped beam to the compression member. The objects of the invention are to provide an improved wedge-shaped block for use in insertion in the head of the strut to bear against the web of the compression member so as to maintain the desired rigidity of the beam and eliminate all lost motion between the strut and compression member, also to provide an arrangement of fastening for the wedge, whereby the strut and wedge can not shift in either direction along the compression member, without reducing the cross section of or weakening the strut casting by any perforation for rivets, bolts or keys.

The objects of the invention are accomplished by the device illustrated in the accompanying drawing, wherein—

Fig. 1 is a fragmentary plan view of a brake beam constructed according to this invention.

Fig. 2 is a horizontal sectional detail of the connection between the strut and the compression member.

Fig. 3 is a sectional view taken on the line 3—3 of Fig. 2.

Fig. 4 is a perspective view of the wedge.

In its general design the beam illustrated comprises the usual truss-formed brake beam having compression and tension members secured together at their ends where the brake shoe heads are carried. The compression and tension members are centrally separated, as usual, by a strut which gives the desired strength and rigidity to the beam. To accomplish the purposes of the present invention the apertured head of the strut through which the compression member passes has its inner surface, or portion thereof, inclined for coacting with a wedge bearing against this surface on one side and against the web of the compression member on the other side. This wedge is forced between the strut and web of the compression member, and then, the web of the compression member and the small end of the wedge are drilled to receive a locking rivet. This rivet not only prevents the wedge from shifting but the head of the rivet engages the edge of the head of the strut preventing movement of the strut in one direction along the compression member. The wedge surfaces prevent movement of the strut along the compression member in the opposite direction.

Referring to the drawings, the brake beam elements consist as usual of a strut 1 separating the compression member 2 and tension member 3. The compression member receives at its ends the ends of the tension member 3 where the two are secured together and carry the usual brake shoe heads 4. The compression member passes through the aperture of the head 5 of the strut, as illustrated in Fig. 2. The outer surface 6 of the compression member 2 bears against the surface 7 of the strut head 5. The inner surface 8 of the compression member bears against the surface 9 of wedge 10. The form of this wedge is clearly illustrated in Fig. 4. Its flanges 11 bear against the coacting plane inclined surface 12 in the head of the strut. A rivet 13 secures the wedge and compression member together in the desired relation and the head of this rivet bears against the edge 14 of the head of the strut, preventing the strut from shifting along the compression member in the direction of the rivet.

In assembling the brake beam, after the compression member is passed through the aperture in the strut head and the ends of the compression and tension members are secured together, the wedge is driven in between the strut and the web of the compression member until the desired tension is imparted to the beam. The compression member and the web of the wedge are then drilled to receive the rivet. After the two are riveted together the head of the rivet prevents displacement of the strut in one direction along the compression member and the coacting inclined surfaces of the strut and the wedge prevent movement in the opposite direction.

Although but one specific embodiment of this invention has been herein shown and described, it will be understood that numerous details of the construction shown may be altered or omitted without departing from the spirit of this invention as defined by the following claims.

I claim:

1. A brake beam comprising compression and tension members secured together at their ends, a central strut, said strut having an eye-shaped head through which passes the compression member, a wedge between the strut and the compression member, and means for locking the wedge and strut against displacement longitudinally with respect to the compression member.

2. A brake beam comprising compression and tension members secured together at their ends, a central strut, said strut having a head with a wedge-shaped aperture through which passes the compression member, a wedge between the strut and the compression member, and means for locking the wedge and strut against displacement longitudinally with respect to the compression member.

3. A brake beam comprising compression and tension members secured together at their ends, a central strut, and a wedge between the strut and compression member, said wedge being riveted to the compression member.

4. A brake beam comprising compression and tension members secured together at their ends, a central strut, and a wedge between the strut and compression member, said wedge being riveted to the compression member with a rivet the head of which bears against one edge of the head of the strut.

5. A brake beam comprising compression and tension members secured together at their ends, a central strut, said compression member being in the form of a channel bar, a wedge between the web of the compression member and the strut, said strut having an inclined surface for coacting with the wedge, and means for securing the wedge to the compression member.

Signed at Chicago this 18th day of June, 1921.

CHARLES F. HUNTOON.